April 5, 1932.  J. M. CHRISTMAN  1,852,874
WOVEN SPRING BOOT
Filed Feb. 18, 1930
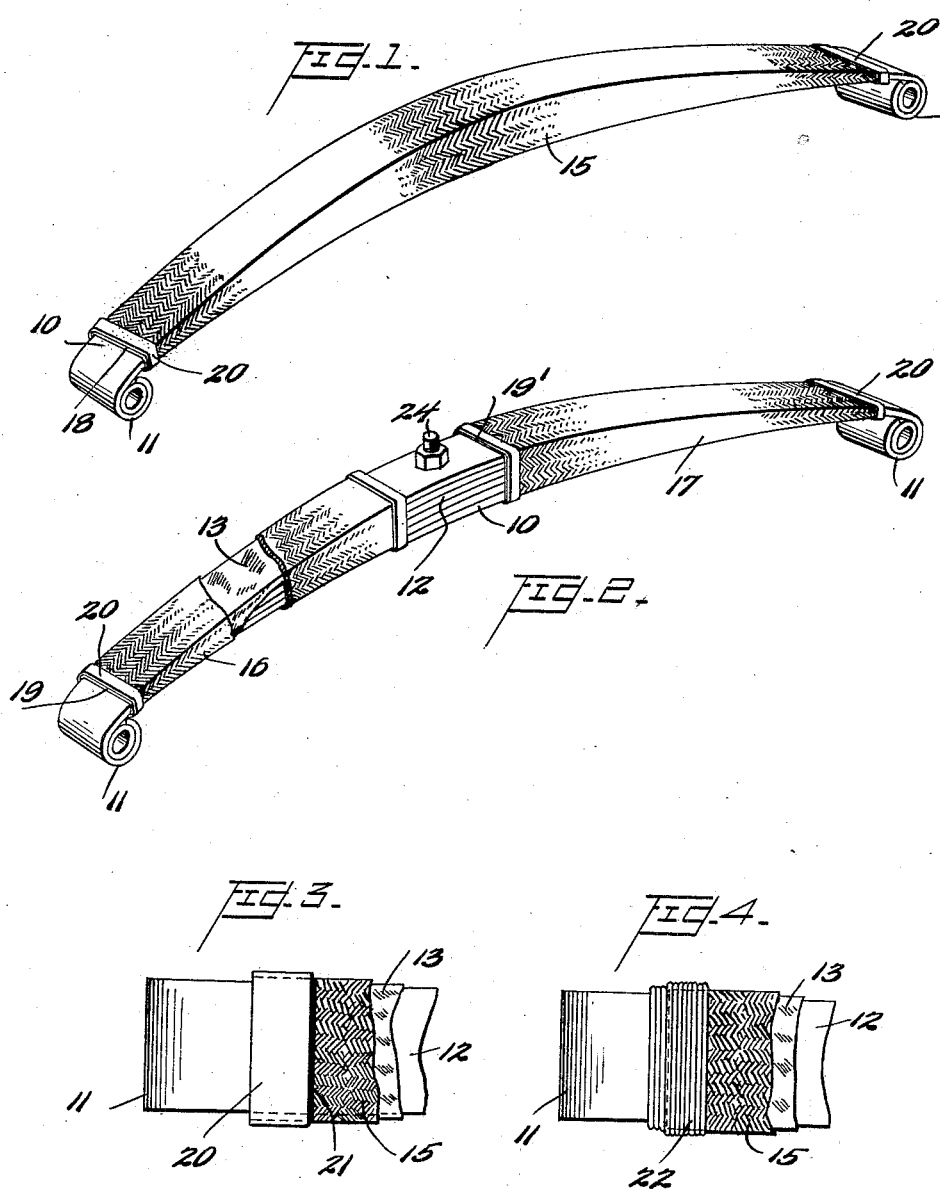
Inventor
J. M. Christman
By Watson, Coit, Morse & Grindle
Attorneys Patented Apr. 5, 1932

1,852,874

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

WOVEN SPRING BOOT

Application filed February 18, 1930. Serial No. 429,435.

This invention relates to vehicle springs and more particulary to boots or protective and lubricant retaining coverings for vehicle springs and to methods of applying such coverings.

It is a general object of the present invention to provide a novel and improved vehicle spring boot or cover whereby the quantity of lubricant thought necessary to insure free flexing of a built-up leaf spring may be retained at all times in contact with the spring, and dust and grit prevented from making entry between the leaves thereof.

More particularly it is an object of the invention to provide a spring boot of a continuous or one-piece woven or braided fabric, the invention contemplating the braiding of a wire fabric directly onto a vehicle spring and extending either the full length of the spring or merely over the end portions thereof which project beyond the attaching means of the axle.

Other and further features and objects of the invention will be more apparent to those experienced in the art upon a consideration of the accompanying drawings and the following detailed description wherein are disclosed several exemplary forms of the invention. It will be understood that the invention includes various specifically different embodiments, the details of construction of the improved spring cover, and the method of applying the same, being subject to considerable modification in commercial practice without departure from the spirit of the invention or the scope of the claims.

In said drawings:

Figure 1 is a perspective view of a vehicle spring having applied thereto a boot constructed according to one form of the present invention;

Figure 2 is a perspective view of a spring having applied thereto boots constructed according to a second form of the invention; and Figures 3 and 4 are partial plan views of the eye ends of a spring showing two methods of fastening the ends of the braid.

The springs of vehicles, and particularly automotive vehicles, are of the leaf type, each having a main leaf provided, at least at one of its ends, with means for attachment to the vehicle frame. These attaching means are often in the form of eyes for the reception of spring bolts, but may be of any construction. Superimposed on the main leaf are a plurality of successive shorter leaves tapering towards the attaching means and with ends of certain of the auxiliary leaves secured to the main leaf by clips. Most vehicles have the axle attached to the center portion of the spring by means of bolts or other clamp means passing around all the leaves of the spring near the center.

It is highly desirable that a lubricant be applied between the leaves of the spring and dirt and water excluded from the whole spring. If a sufficient quantity of lubricant is applied and adequately protected, the springs will not require lubricating for a long period of time. The present invention contemplates a novel form of protecting means for the lubricant and spring leaves.

Referring to the drawings, there is disclosed in Figures 1 and 2 one conventional form of vehicle spring having a main leaf 10 provided at its ends with the spring eyes 11. The spring may be bowed, as shown, or straight, and in addition to the main leaf 10 has a plurality of supplemental leaves 12, each successively shorter than the preceding one, counting from the main leaf, and each tapered in thickness but customarily of uniform width so that the whole spring takes a contour substantially as shown in Figure 1. When the spring is constructed it is carefully lubricated between the leaves and covered all over its exterior with a heavy covering of suitable grease which is retained in position by a suitable covering or wrapping of fabric as shown in 13. For instance, a single layer of material, such as canvas, is applied over the whole spring to retain the grease and to exclude, to a certain extent, dirt and water.

To protect this wrapping the present invention proposes to apply a braided or woven metal covering 15 closely conforming to the shape of the spring and extending as near as possible to the eyes or other fastening means at the spring ends.

In Figure 1 this covering 15 is shown as continuous from one end fastening means to the other and extending over the central portion of the spring to completely enclose all of the leaves. Any means for fastening the spring to the axle will surround the central portion of the covering.

Figure 2 shows the spring boot or covering in two pieces 16 and 17, each extending from just beyond the central portion, where the axle fastening means is received, to the spring eye.

Since the spring eye or other end-attaching means for the spring is larger in cross-section than the smallest cross-section of the spring near the eye it is not possible to pre-form the boot sections, such as shown in Figure 2, and slide them over the spring and of course it is impossible to pre-form the full length boot of Figure 1 so that this invention contemplates forming the boot directly onto the spring by a braiding process. The boot is braided from non-corrodible wire or strip such as galvanized iron, brass, bronze, or the like. This wire is braided in the same manner as the common fabric braid used to cover electrical conductors and also used for shoe-strings and similar articles. It is applied by a well known form of machine, which need not be illustrated here, and can be applied over articles of irregular cross-sections in such a manner that it readily conforms substantially to the outer surface of the articles. In this manner the spring cover can be braided, using the spring as the form, so that the cover closely conforms to the contour of the spring and provides a neat, compact covering therefor and one that is flexible so that it will not materially resist the flexing of the spring nor will it be pulled out of shape or wrinkled by flexing of the spring, due to the diagonal lay of the wires of the braid resulting from the braiding operation.

Where the braiding terminates, as at 18 in Figure 1 and at 19 and 19' in Figure 2, some means are required to prevent unravelling and to cover the ends of the wires, which means is shown in Figure 3, where a metal band or strap 20 is wrapped around over the ends of the springs and conveniently soldered thereto as at 21. Another means is shown in Figure 4 where the end of the braid is wrapped with a number of convolutions of wire 22 which overlap the end of the braid and extend a distance toward the spring eye and rest conveniently against the eye to prevent slippage. These wires can be soldered together and to the braid if it is found desirable.

This form of spring boot or cover has sufficient mechanical strength to act effectively to retain the leaves of the spring together when the body of the car is pitched upwardly by a severe bump so that the whole work is not thrown on the main leaf. This permits the usual spring clips, previously mentioned, to be eliminated which not only effects a saving in material and labor but produces a finished job having a much smoother exterior. During the forming of the boot on the spring the leaves are held together by the usual central bolt 24.

A spring boot constructed according to the present invention is extremely cheap to manufacture and can be applied with great rapidity; conforms substantially to the contour of the spring; fits extremely close; has a neat appearance and adequately protects the spring while being substantially flexible to conform to any change in shape of the spring resulting from bending.

Having thus described the invention, what is claimed as new and desired to be secured by Letters Patent is:

1. A boot for a multi-leaved vehicle spring composed of a seamless tapering tube of interwoven metal enclosing all of the leaves of the spring.

2. A boot for a multi-leaved vehicle spring composed of a continuous tube of interwoven metal closely fitting and covering all of the leaves of the spring.

3. A boot for a multi-leaved vehicle spring composed of a continuous tube of interwoven metal and turns of wire securing the ends of the braids together and clamping them to the spring.

4. The combination of a multi-leaved vehicle spring and a continuous, flexible, interwoven metal enclosing means therefor formed in place thereon and closely engaging the same.

5. The combination of a multi-leaved vehicle spring and a flexible metal fabric casing closely engaging the outer surface of the spring and interwoven onto the spring.

6. The combination of a multi-leaved spring having an attaching means at the end larger than the smallest cross-section of the spring and a seamless interwoven metal boot closely conforming to said spring and extending to the smallest cross-section thereof.

7. In a device of the character described, the combination of a spring composed of a plurality of cooperating superposed leaves, a lubricant-retaining winding encasing said leaves, and an outer cover braided into close conformity to said winding.

8. In a device of the character described, the combination of a spring composed of a plurality of cooperating superposed leaves successively shorter than the main leaf, attaching means at the ends of the main leaf, and an interwoven metal boot fully enclosing and closely conforming to the leaves of the spring and extending between the attaching means.

9. The method of forming a boot for a multi-leaved spring comprising interweaving metal tightly about all of the spring leaves.

10. The method of applying a boot to a vehicle spring comprising, lubricating the spring leaves, covering the leaves with a fabric wrapping and braiding metal over said fabric to cause it to conform closely to the contour of the spring.

11. The method of causing a vehicle spring boot to conform closely to the exterior of a multi-leaved spring comprising interweaving the boot from resilient metal strips and using the whole spring as a form during the said interweaving.

In testimony whereof I hereunto affix my signature.

JOHN M. CHRISTMAN.